H. H. VAN KEUREN.
COLLAPSIBLE GEOGRAPHICAL GLOBE.
APPLICATION FILED MAY 17, 1909.

952,119.

Patented Mar. 15, 1910.

Witnesses
O. M. Harrel.
Anna M. Murray

Inventor
Herbert H. VanKeuren,
By Shepherd & Campbell
Attorneys

UNITED STATES PATENT OFFICE.

HERBERT H. VAN KEUREN, OF BALDWIN, KANSAS.

COLLAPSIBLE GEOGRAPHICAL GLOBE.

952,119.

Specification of Letters Patent. Patented Mar. 15, 1910.

Application filed May 17, 1909. Serial No. 496,592.

*To all whom it may concern:*

Be it known that I, HERBERT H. VAN KEUREN, a citizen of the United States, residing at Baldwin, in the county of Douglas and State of Kansas, have invented certain new and useful Improvements in Collapsible Geographical Globes, of which the following is a specification.

This invention relates to geographical globes commonly employed as educational appliances in schools and the like, the object of the invention being to provide a device of this character constructed in such manner that it may be readily folded into a small compass when not in use.

A further object of the invention is the provision of a supporting stand adapted to support globes therein in such manner that a globe of one character may be removed and another substituted therefor with very little trouble.

Figure 1:
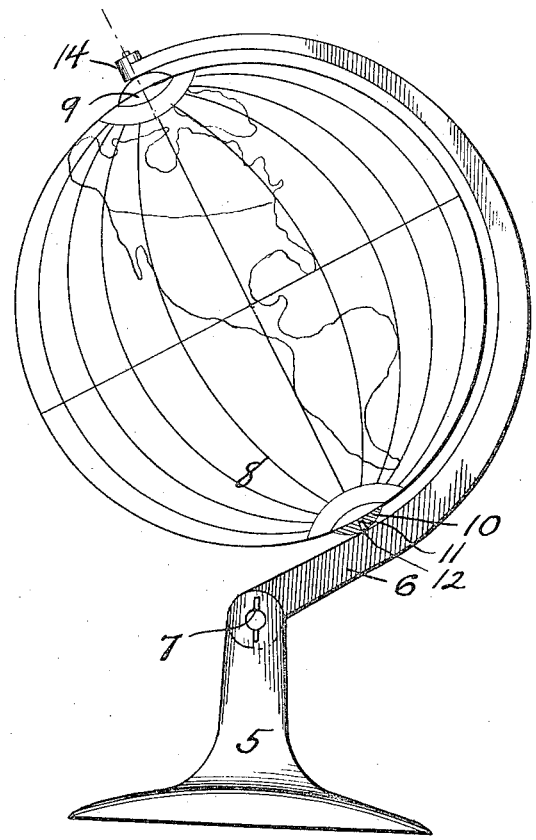
Figure 2:
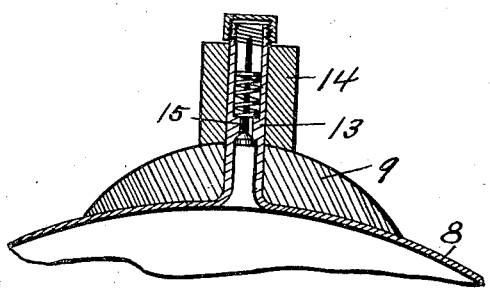
Figure 3:
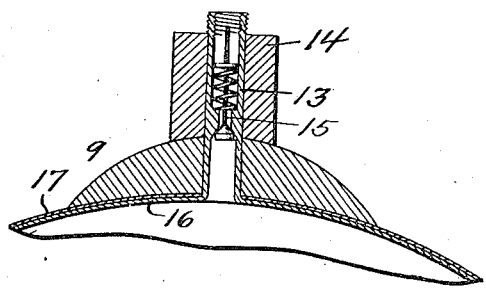

Further objects and advantages of the invention will be set forth in the detailed description which now follows:

In the accompanying drawing, Figure 1 is a side elevation of a globe constructed in accordance with the invention; Fig. 2 is a detail transverse section and Fig. 3 is a similar sectional view showing a modified form of the device.

Like numerals designate corresponding parts in all of the figures of the drawing.

Referring to the drawing, the numeral 5 designates a supporting stand to which a bowed bracket arm 6 is pivotally connected by a set screw 7. When this set screw is loosened, the base 5 may be folded up into the bow of the bracket arm 6. A collapsible globe 8 adapted to be filled with compressed air carries bearing blocks 9 and 10 preferably of light wood, though said bearing blocks may be made of other material if desired. These bearing blocks are located concentrically within the arctic and antarctic circles upon the globe. The lowermost bearing block has a socket 11 formed therein for the reception of a fixed bearing pin 12. The upper bearing block 9 is perforated for the reception of an inflation tube 13, said inflation tube passing through and being journaled in a bearing head 14 of bracket 6. The inflation tube 13 carries a spring actuated check valve 15 such as is commonly employed in bicycle tires and the like. The geographical figures, charts and the like may be imprinted directly upon the globe as shown in Figs. 1 and 2, and the inflation tube may lead directly into the interior of the globe that carries the map or chart, or as has been indicated in Fig. 3, this inflation tube may lead to an inner lining of rubber or the like, indicated at 16, and this rubber lining may be covered by a linen or other fabric casing 17 upon which the map is printed.

By providing an inflation means in the journal of the globe, the remaining surface of the globe is unmarred. Furthermore, by providing a globe inflated with air in this manner and journaled in the bowed bracket arm such as has been shown and described, one globe may be readily removed and another substituted therefor, for it is apparent that the top of the globe may be depressed enough when filled with air to free the inflation tube 13 of the bearing arm 14 after which the lower block 10 may readily be disengaged from the bearing pin 12. By virtue of this construction, a single stand will serve as a means of support for a set comprising a number of globes and each of these globes will ocupy but a very small space when deflated. The employment of a number of globes will greatly facilitate the teaching of pupils by means of globes of this character. Where only a single globe is employed, and permanently mounted in its bearings, so much matter must be printed upon the globe that the result is very confusing; but with a number of globes or a set of globes, one globe may be devoted to just the data necessary to yield information concerning latitude and longitude, another globe may be devoted to ocean currents, another to illustrate the position of the international date line and so forth. Furthermore, celestial globes have been employed containing astronomical data, and a globe of this character may be likewise employed in connection with this invention.

From the foregoing description it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claim.

Having described my invention, what I claim is:

The combination with a globe of flexible material, of rigid diametrically opposed bearing blocks, a bowed bracket arm, a fixed bearing pin carried by said bracket arm adapted to enter a socket of one of said bearing blocks, an inflation tube connected to said globe and passing through the other of said bearing blocks and through the extremity of said bracket arm.

In testimony whereof I affix my signature in presence of two witnesses.

HERBERT H. VAN KEUREN.

Witnesses:
CHAS. E. BERKS,
ZONA FOLLIN.